United States Patent
Lipphardt et al.

(10) Patent No.: US 12,287,051 B2
(45) Date of Patent: Apr. 29, 2025

(54) CONNECTING DEVICE

(71) Applicant: REHAU INDUSTRIES SE & CO. KG, Rehau (DE)

(72) Inventors: Tobias Lipphardt, Hemhofen (DE); Jürgen Sieber, Herzogenaurach (DE)

(73) Assignee: REHAU INDUSTRIES SE & CO. KG, Rehau (DE)

( * ) Notice: Subject to any disclaimer, the term of this patent is extended or adjusted under 35 U.S.C. 154(b) by 26 days.

(21) Appl. No.: 18/010,776

(22) PCT Filed: Jul. 5, 2021

(86) PCT No.: PCT/EP2021/068495
§ 371 (c)(1),
(2) Date: Dec. 15, 2022

(87) PCT Pub. No.: WO2022/012990
PCT Pub. Date: Jan. 20, 2022

(65) Prior Publication Data
US 2023/0228354 A1    Jul. 20, 2023

(30) Foreign Application Priority Data
Jul. 17, 2020 (DE) .......................... 202020104140.1

(51) Int. Cl.
*F16L 27/107* (2006.01)
(52) U.S. Cl.
CPC ................... *F16L 27/107* (2013.01)
(58) Field of Classification Search
CPC ......... F16L 27/10; F16L 27/107; F16L 21/00; F16L 21/002; F16L 21/005; F16L 21/06;
(Continued)

(56) References Cited

U.S. PATENT DOCUMENTS

| 3,801,141 A | 4/1974 | Hollingsworth |
| 5,039,137 A | 8/1991 | Cankovic et al. |

(Continued)

FOREIGN PATENT DOCUMENTS

| DE | 102007061288 A1 | 6/2009 |
| DE | 102012002196 A1 | 7/2013 |

(Continued)

OTHER PUBLICATIONS

German Patent Office, Research Report in German Application DE202020104140U1, dated Nov. 25, 2021.
(Continued)

*Primary Examiner* — Aaron M Dunwoody
(74) *Attorney, Agent, or Firm* — Aird & McBurney LP (57) ABSTRACT

A connecting device for connecting a first and second tube has a sealing sleeve, support elements and first and second clamping bands. First and second end portions of the sealing sleeve receive tube end portions of the first and second tube, respectively. Deformable support elements are arranged on the outer face of the sealing sleeve without being connected to each other, such that first and second support element contact pressing portions of the support elements form first and second openings for receiving first and second end portions, respectively, of the sealing sleeve. A deformable connecting portion connects the first and second support element contact pressing portions. The first and second clamping bands shorten or extend to vary the spacing between the first and second support element contact pressing portions, respectively, to compress or relax the first and second end portions, respectively, of the sealing sleeve.

8 Claims, 4 Drawing Sheets

(58) Field of Classification Search
CPC ......... F16L 21/08; F16L 21/065; F16L 25/14; F16L 49/02
USPC ........................................................ 285/236
See application file for complete search history.

(56) References Cited

U.S. PATENT DOCUMENTS

| | | |
|---|---|---|
| 5,431,458 A | 7/1995 | Schaub et al. |
| 2009/0160183 A1 | 6/2009 | Felber |

FOREIGN PATENT DOCUMENTS

| | | |
|---|---|---|
| DE | 102012101553 A1 | 8/2013 |
| DE | 102012005943 A1 | 9/2013 |
| DE | 202013101678 U1 | 8/2014 |
| DE | 102014119501 A1 | 6/2016 |
| DE | 102016105627 A1 | 9/2017 |
| DE | 102017107258 B3 | 8/2018 |
| GB | 280915 A | 5/1928 |

OTHER PUBLICATIONS

European Patent Office, International Search Report in PCT/EP2021/068495, dated Jul. 5, 2021.

CONNECTING DEVICE

BACKGROUND OF THE INVENTION

The present invention relates to a connecting device for pressing a sealing sleeve onto a first and a second tube and an assembly having such a connecting device. In order to establish a connection between two wastewater tubes, in particular, it is known practice to connect tube end portions of the two tubes via a sealing sleeve and to provide an aid for pressing the sealing sleeve onto the two tubes in order to secure or strengthen the connection.

For this purpose usually clamping bands or clamping collars are used to press the sealing sleeve onto the tubes to be connected.

In the field of wastewater, in particular, it is often necessary to connect two tubes of different outer diameters. For pressing a sealing sleeve onto the two tubes, it is known from DE10 2012 10 15 53 to provide a sleeve which can be contracted by means of clamping bands for pressing onto the sealing sleeve, the design of the sleeve making an adaptation to the different outer diameters possible.

When tubes of very different outer diameters are to be connected, this solution reaches its limits, because due to the high mechanical stress acting on the sleeve at the transition between the very different outer diameters of the tubes, the sleeve may leak or even break at the connection point.

Underlying Problem

In respect of the known solution, the object of the present invention is to provide an improved connecting device by means of which it is possible, in a simple manner, to press a sealing sleeve onto a first and a second tube of very different outer diameters, wherein a reliable fluid tightness is to be achieved.

In this case, the tubes can have different outer diameters or different outer contours. In addition, an assembly having such a connecting device is to be provided.

SOLUTION ACCORDING TO THE INVENTION

According to the invention, the first object is achieved by a connecting device in which a sealing sleeve is pressed onto a first and a second tube of very different outer diameters, the connecting device having the features of described herein.

The second object is achieved by an assembly having the features described herein. According to the invention, to achieve the first object, a connecting device is to be provided with which a sealing sleeve can be pressed onto a first and a second tube. According to the invention, the connecting device is configured as follows:

The connecting device for connecting a first and a second tube comprises a sealing sleeve, a plurality of support elements and at least two clamping bands. For forming the connection, a first of two end portions of the sealing sleeve receives a tube end portion of the first tube, and the second end portion receives a tube end portion of the second tube, which are connected to each other by means of the sealing sleeve, the sealing sleeve having an inner side and an outer side, and the plurality of support elements being arranged along the outer side of the sealing sleeve without being connected to each other. Each support element at least partly consists of or contains a deformable material. Each support element has a first support element contact pressing portion and a second support element contact pressing portion, the first support element contact pressing portions being arranged one following the other along a circumference of a first circle along the outer side of the sealing sleeve and forming a first support element end portion having a first opening for receiving the first end portion of the sealing sleeve, and the second support element contact pressing portions being arranged one following the other along a circumference of a second circle along the outer side of the sealing sleeve and forming a second support element end portion having a second opening for receiving the second end portion of the sealing sleeve, at least one first support element contact pressing portion being connected to a second support element contact pressing portion by means of at least one deformable connecting portion.

By means of shortening or extending of the clamping bands, which are in the form of a first clamping band and a second clamping band, the first clamping band being associated with the first support element contact pressing portion and the second clamping band being associated with the second support element contact pressing portion, the first support element contact pressing portions can be positioned closer to or farther from each other along the circumference of the first circle along the outer side of the sealing sleeve and thus compress or relax the first end portion of the sealing sleeve, and the second support element contact pressing portions can be positioned closer to or farther from each other along the circumference of the second circle along the outer side of the sealing sleeve and thus compress or relax the second end portion of the sealing sleeve.

A connecting device according to the above description overcomes the disadvantages of the prior art, has a simple structure, can be produced easily, quickly, reproducibly and cost-effectively and has reliable fluid tightness.

Because it is provided for the plurality of support elements to be arranged along the outer side of the sealing sleeve without being connected to each other, such a connecting device can, on the one hand, be assembled in a simple manner, and on the other hand, the individual support elements can move independently of each other when the clamping band is tightened, which prevents jamming or another hindrance to movement.

Within the context of the present invention, it can prove particularly advantageous if the support element has at least one fixing projection or at least one fixing receptacle.

As a result of the formation of at least one fixing projection or at least one fixing receptacle on the support element, a connection with the sealing sleeve can be produced in a simple manner, if said sleeve has receptacles or projections congruent to the at least one fixing projection or to the at least one fixing receptacle of the support element.

In this manner, the support element is protected against unwanted displacement with respect to the sealing sleeve.

In a highly preferred development of the present invention, the support element can be designed such that it has at least one holding projection.

As a result of the formation of a holding projection on the support element, which is arranged on the edges of the support element in the direction of the axis A of the connecting device, the edge of the sealing sleeve can be engaged over and thus the sealing sleeve can be protected against an unwanted displacement with respect to the support element.

Such a holding projection can have a height of 3 to 12 mm (millimeters).

In a particularly preferred development of the present invention, it can be provided to advantage that the support elements are the same among each other.

In this manner, the number of support elements needed to build the connecting device can be effected using one tool in a simple, fast, reproducible and cost-effective manner.

In this manner, with the aid of a further tool, it is also simple to produce differently sized support elements which have the same advantages and which are needed for connecting devices which can be used for other tube dimensions.

With the present invention, it can prove highly advantageous if the plurality of support elements for a connecting device is four, five, six, seven, eight, nine, ten, eleven, twelve, thirteen, fourteen or fifteen.

By ensuring that the plurality of support elements for a connecting device is four, five, six, seven, eight, nine, ten, eleven, twelve, thirteen, fourteen or fifteen, a connecting device can be built which is precisely adapted to the dimensions of the tubes to be connected.

Attention must be paid here to the size of the used sealing sleeve, which specifies the plurality of support elements.

To great advantage, a development of the present invention can be configured such that the sealing sleeve has, on its inner side, at least one sealing lip, which projects inwards from the inner surface and is arranged along a curve which is formed continuously between a first plane E1 and a second plane E2.

Due to providing that the sealing sleeve has, on its inner side, at least one sealing lip, which projects inwards from the inner surface and is arranged along a curve which is formed continuously between a first plane E1 and a second plane E2, on the one hand, the tube to be connected can be easily inserted into the sealing sleeve, because it initially only comes into contact with portions of the sealing lip, and on the other hand, this arrangement allows for a defined compression of the seal, resulting in reliable tightness.

Arranging the sealing lip along a curve which is formed continuously between a first plane E1 and a second plane E2 can for example follow a sine-shaped curve.

In another embodiment of the invention, it can be provided for the sealing lip to follow a continuous line along the inner side of the sealing sleeve.

To that end, the sealing lip is arranged in a continuous line in a plane.

Depending on what is needed, both designs of the sealing lip can be provided in a sealing sleeve.

While the first stated solution with the sealing lip formed along a curve is suitable for tubes having a smooth wall on the outer side, the second solution with a continuous-line sealing lip is the option in particular for corrugated tubes, because this takes account of the outer contours of the tube and thus leads to reliable tightness.

In the present invention, it can be advantageously provided that the sealing sleeve has, on its inner side, at least one groove in which a swellable sealing element is received.

In the event of water or moisture entering, such a swellable sealing element swells up and provides a sealing effect because it expands and as a result rests against the tube surface and against the groove of the sealing sleeve, and thus ensures the fluid tightness of the connecting device.

In the present invention, it can be advantageously provided that the support element has at least one guide projection which rises up 2 to 3 mm (millimeters) from the support element and is suitable for guiding the clamping band. In a development, the guide projection can also be designed such that it engages over the clamping band. In this way, the clamping band can be reliably guided on the support element and cannot slide off the support element when it is tightened.

A clamping band made of stainless steel which is commercially available and thus easy to procure is suitable as the clamping band.

The support elements can be easily produced in a plastic shaping process such as an injection molding process.

To this end, the support element is formed from or contains a polymer material. The polymer material is preferably a thermoplastic, and particularly preferably a polyolefin, such as, for example, a polypropylene or a polyethylene or a polybutylene, or a copolymer of the above, or a cross-linked polyolefin, more particularly a cross-linked polyethylene, or a polyvinyl chloride, or a polyurethane, or a polyvinyl chloride or a polycarbonate or a polyamide or a polystyrene or another suitable material. Alternatively, it is possible to produce the support element in a 3D printing process. The sealing sleeve can consist of or contain an elastomeric material, the elastomeric material preferably being a synthetic rubber or a thermoplastic elastomer or a natural rubber or a nitrile rubber or a butyl rubber or an EPDM (ethylene propylene diene rubber) or an SBR (styrene butadiene rubber) or an NBR (nitrile butadiene rubber).

The second object of the present invention, is achieved by an assembly having a connecting device as described herein.

It was found that an assembly comprising a connecting device according to the above description and a first and a second tube which are connected to each other with the aid of the connecting device, wherein for forming the connection, a first of two end portions of the sealing sleeve receives a tube end portion of the first tube, and the second end portion receives a tube end portion of the second tube, which are connected to each other via the sealing sleeve, completely achieves the object.

With the connecting device according to the invention, it is possible to provide a connection between tubes of very different outer diameters or very different outer contours.

In the context of the invention, the term "tubes" is always understood to mean not only tubes and pipes but also tube bends, tube branches, tubular reducers and the like, which are thus also covered by the invention.

This is achieved in that by providing the enlargeable or reducible clear width of the two end portions of the sealing sleeve, in combination with providing, according to the invention, that the support elements are arranged individually, without being connected among each other, on the outer side of the sealing sleeve, the connecting device according to the invention can be advantageously adapted to the existing deviations between the outer diameters of the tubes to be connected.

In particular the solution of providing individually arranged support elements, which are not connected to each other, on the outer side of the sealing sleeve, yields a high flexibility of the system, which both takes account of the size of the outer diameter deviations to be bridged between the tubes to be connected and enables reliable fluid tightness.

When the clamping bands are tightened to produce the fluid-tight combination of the connecting device and the two tubes to be connected, the support element is pressed onto the sealing sleeve, which is thus in turn pressed onto the outer sides of the tubes to be connected.

This results in relative movements of the support elements among each other, which move closer together along the outer side of the sealing sleeve and slide beyond and over the outer side of the sealing sleeve. This can be supported by a smooth design of the outer side of the sealing sleeve, by a smooth side of the support elements sliding on the sealing sleeve, or by adding a lubricant between the support elements and the sealing sleeve.

The support elements themselves are formed flexibly to a high degree, owing to the middle region, which has multiple perforations and through the edge-side connecting arcs which together enable a high resilient movability of the support element during tightening.

The connecting device according to the invention is used wherever tubes of different diameters or different outer contours are to be connected in a fluid-tight manner, i.e. in the supply of water and other media, in the disposal of said media, more particularly in the field of wastewater engineering, in general wherever fluid is received, stored and conveyed in tubes. This relates to municipal supply and disposal, the industrial infrastructure, agriculture, fruit-growing and horticulture, food, beverage, medical and pharmaceutical engineering, as well as the automotive, aerospace and shipbuilding industries.

Other important features and advantages of the invention result from the dependent claims, the Figures and associated description of the Figures.

It is to be noted that the features indicated above and to be described below can be applied not only in their specified combination, but also in other combinations or in isolation, without departing from the scope of the present invention.

Preferred exemplary embodiments of the invention are illustrated in the Figures and are explained in greater detail in the description below, wherein the same reference characters refer to the same or functionally equivalent or similar components.

BRIEF DESCRIPTION OF THE DRAWINGS

Exemplary Embodiments of the invention are explained in greater detail below based on the attached drawings.

Figure 1:
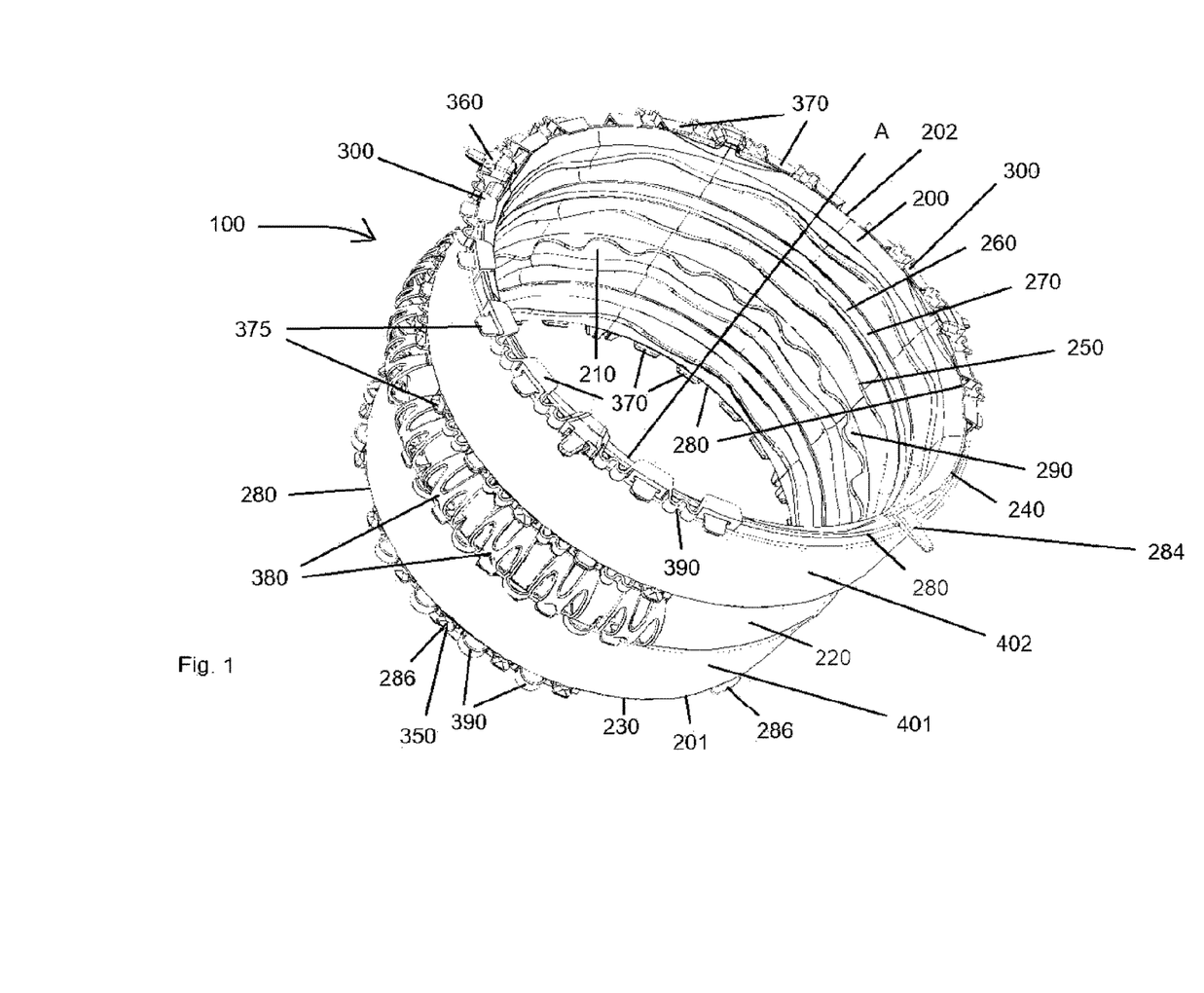
FIG. 1 a three-dimensional first illustration of an exemplary embodiment of a connecting device according to the invention.

Shown are in:

FIG. 1 shows a three-dimensional first illustration of an exemplary embodiment of a connecting device 100 according to the invention.

For the sake of clarity, the connecting device 100 is not shown in full; it can however be readily conceptually extended.

Thus only four of five support elements 300 are depicted on the connecting device 100.

The connecting device 100 according to the invention comprises a sealing sleeve 200 which is hollow-cylindrical and has an inner side 210 and an outer side 220. Sealing lips 250 project from the inner side 210 of the sealing sleeve 200, said sealing lips having a sealing effect with respect to the surfaces of the (not illustrated) tubes to be connected, which are inserted into the sealing sleeve 200.

Figure 2:
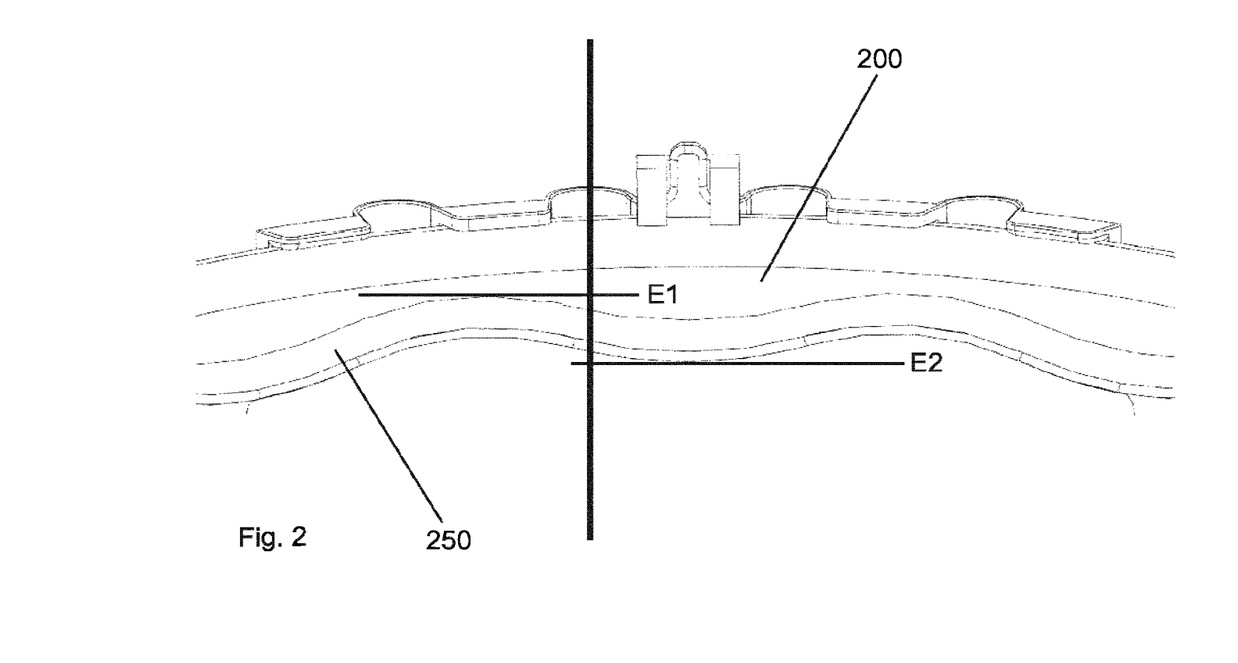
FIG. 2 a three-dimensional illustration of a portion of the inner side of the sealing sleeve with the sealing lip.

For details about the arrangement of the sealing lips 250, see the description of FIG. 2.

The tubes can be inserted into the sealing sleeve 200 up to a stop 290.

On the inner side 210 of the sealing sleeve 200, a groove 260 is formed in which a swellable sealing element 270 is arranged.

With regard to the stop 290, the sealing sleeve 200 is formed mirror-symmetrically, and therefore the respective sealing lips 250 the groove 260 in which the swellable sealing element 270 is arranged, are in each case provided as pairs.

The sealing sleeve 200 has a first end portion 201 and a second end portion 202. On the edge 280 of the sealing sleeve 200, either sealing sleeve fixing projections 284 are formed, as shown in FIG. 1 on the edge 280 of sealing sleeve 200 facing the viewer, or sealing sleeve fixing receptacles 286 are formed, as shown on the edge 280 of sealing sleeve 200 facing away from the viewer.

It is to be noted that a sealing sleeve 200 is designed either entirely only with sealing sleeve fixing projections 284 according to the design described above, or alternatively only with sealing sleeve fixing receptacles 286.

However, it is also possible to design the sealing sleeve 200 in accordance with FIG. 1. Along the outer side 220 of the sealing sleeve 200, a plurality of—in FIG. 1, four are shown—support elements 300 are arranged.

The support element 300 omitted in FIG. 1 can easily be mentally added and is missing because the design of the sealing sleeve 200 can be shown in more detail at this point.

The support elements 300 are arranged individually, without being connected to each other, on the outer side 220 of the sealing sleeve 200.

Figure 4:
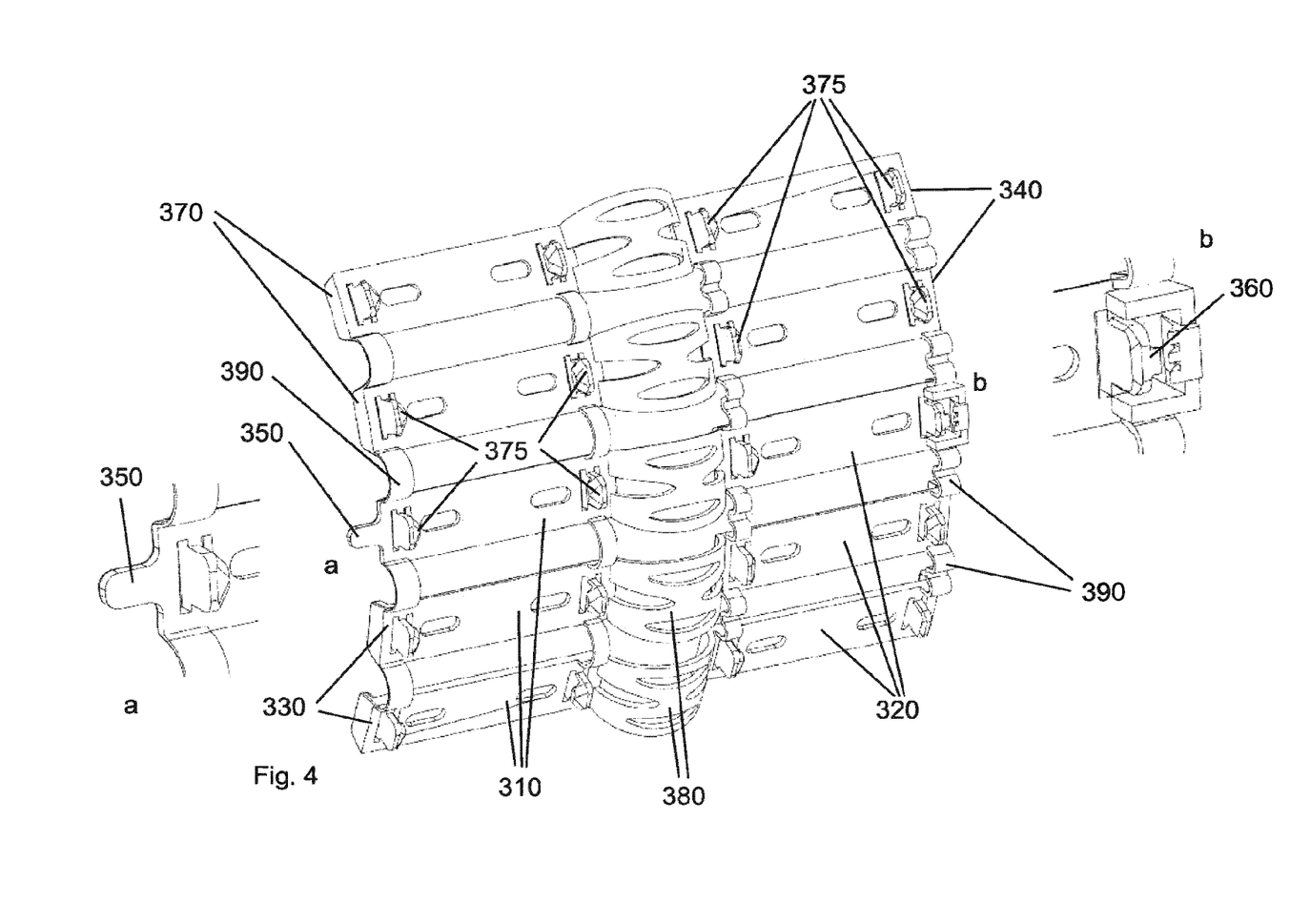
FIG. 4 a three-dimensional illustration of a support element.

For details about the support elements 300, see the description of FIG. 4.

To establish tightness between the connecting device 100 and the inserted tubes, not shown here, two clamping bands 401, 402 are arranged on the support elements 300. The length of the clamping bands 401, 402 can be reduced, to which end locks or other equipment, not shown but known to a person skilled in the art, are provided. When the length of the clamping bands 401, 402 is reduced, the support elements 300 are pushed onto the sealing sleeve 200 and are pressed against the outer surface of the inserted tubes, thereby establishing tightness.

The first support element contact pressing portions 310 of the support elements 300, which are shown and described in FIG. 4, but here in FIG. 1 are located under the clamping band 401, are arranged one following the other along a circumference of a first circle 230 along the outer side 220 of the sealing sleeve 200.

The second support element contact pressing portions 320 of the support elements 300, which are shown and described in FIG. 4, but here in FIG. 1 are located under the clamping band 402, are arranged one following the other along a circumference of a second circle 240 along the outer side 220 of the sealing sleeve 200.

An axis A extends through the connecting device 100 and can be in alignment with the axes of the tubes to be inserted and connected, but the flexibility of the connecting device 100 is so great that a max. angular deflection of 7° is possible without impairing the tightness.

FIG. 2 shows a three-dimensional illustration of a portion of the inner side 210 of the sealing sleeve 200 with the sealing lip 250.

On the inner side 210 of the sealing sleeve 200, a sealing lip 250 is arranged such that it projects inwards from the inner side 210.

The sealing lip 250 is arranged along a curve which is formed continuously between a first plane E1 and a second plane E2.

In the present embodiment of the sealing sleeve 200, the curve along which the sealing lip 250 is arranged is approximately sine-shaped.

In a preferred embodiment of the invention, the two planes E1 and E2 are parallel to each other and are both aligned perpendicular to axis A of the connecting device 100.

Figure 3:
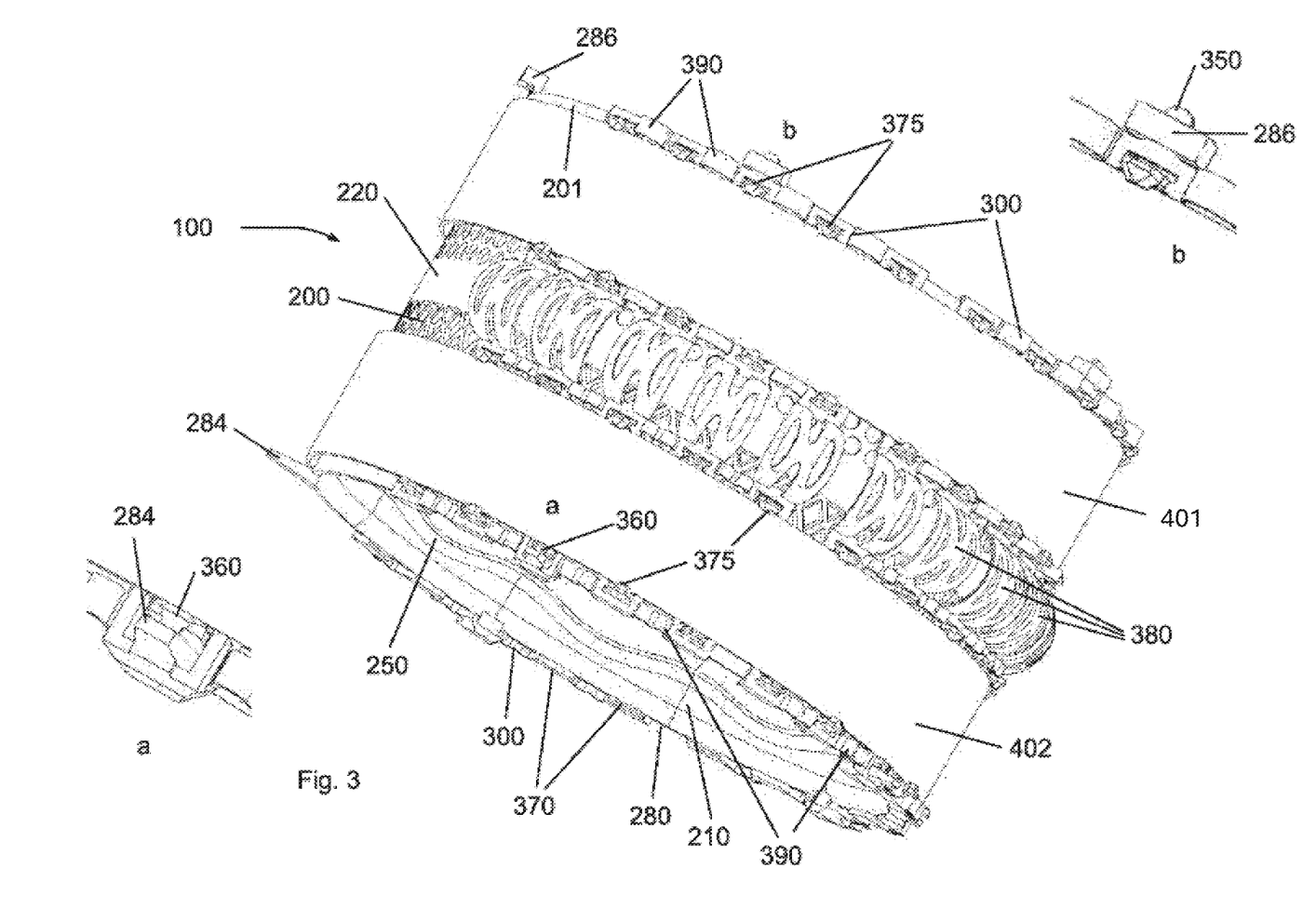
FIG. 3 a three-dimensional second illustration of an exemplary embodiment of a connecting device according to the invention.

FIG. 3 shows a three-dimensional second illustration of an exemplary embodiment of a connecting device 100 according to the invention.

For the sake of clarity, the connecting device 100 is not shown in full; it can however be readily mentally extended.

Thus only four of five support elements 300 are depicted on the connecting device 100.

FIG. 3 shows in detail the connection between the sealing sleeve 200 and the support elements 300.

In an embodiment of the sealing sleeve 200, said sealing sleeve has, on the edge 280, a number of sealing sleeve fixing projections 284, which correspond to the number of support elements 300 to be connected thereto.

The sealing sleeve fixing projections 284 project outwards from the edge 280 of the sealing sleeve 200.

The sealing sleeve fixing projections 284 can be inserted into correspondingly congruent fixing receptacles 360 on the edge of the support elements 300 and thus connect the sealing sleeve 200 to the support elements 300, as shown in detail a of FIG. 1.

In an alternative embodiment of the sealing sleeve 200, said sealing sleeve can have, on the edge 280, sealing sleeve fixing receptacles 286, the number of which in turn corresponds to the number of support elements 300 to be connected thereto. Correspondingly congruently configured fixing projections 350, which are formed on the edge of the support elements 300, can be inserted into the sealing sleeve fixing receptacles 286 and thus connect the sealing sleeve 200 to the support elements 300, as shown in detail b of FIG. 1.

The sealing sleeve fixing projections 284 or sealing sleeve fixing receptacles 286 on the edge 280 of the sealing sleeve 200 are distributed such that they are each equally spaced apart from their direct neighbor.

On the edge-side of the support elements 300, holding projections 370 are arranged which extend around the edge 280 of the sealing sleeve 200 and thus prevent an unwanted displacing of the sealing sleeve 200 with respect to the support elements 300. On the support elements, guide projections 375 are arranged which guide the clamping bands 401, 402. The guide projections 375 can be designed such that they engage to a certain extent over the clamping bands 401, 402, wherein the overlap can be between 2 and 3 mm (millimeters). In this way, the clamping bands 401, 402 are protected from undesirably sliding-off from the support elements 300.

The flexibility of the connecting device 100 of the present invention is mainly provided in that the connecting portions 380 of the support elements 300 together with the connecting arcs 390 permit a high mobility of the assembly and therefore tubes of different dimensions can be simply connected in a fluid-tight manner by means of the connecting device 100.

FIG. 4 shows a three-dimensional illustration of support element 300. The support element 300 has an approximately rectangular curved shape and comprises five portions, which are connected to each other by connecting arcs 390.

On the left-hand side, FIG. 4 shows that the connecting arcs 390 are designed as single arcs, while on the right-hand side of FIG. 4, these are each designed as double arcs.

It is clear that a support element 300 is designed entirely in accordance with the design on either the left-hand side of FIG. 4 or the right-hand side of FIG. 4, or is designed as shown in FIG. 4.

The support element 300 comprises a first support element contact pressing portion 310 and a second support element contact pressing portion 320, which are connected to each other by a connecting portion 380. The connecting portion 380 has multiple perforations, and therefore a high degree of flexibility is provided there which allows the first support element contact pressing portion 310 to be moved relative to the second support element contact pressing portion 320.

FIG. 4 also shows that a projection 350 is formed and fixed on a support element 300 and projects laterally from the support element 300.

Alternatively, a fixing receptacle 360 can be formed on the support element 300, as shown on the left-hand side of FIG. 4.

To this end, the fixing projection 350 is shown as detail a on the left-hand side of FIG. 4, and the fixing receptacle 360 as detail b on the right-hand side of FIG. 4. The fixing projection 350 serves to be introduced into a correspondingly congruent receptacle on the sealing sleeve 200, not shown here, the fixing receptacle 360 serves for connection to a projection on the sealing sleeve 200, not shown here. An unwanted displacement of the support element 300 relative to the sealing sleeve 200 can thus be counteracted.

The clamping bands 401, 402, not shown here, can be arranged on the first support element contact pressing portion 310 and on the second support element contact pressing portion 320. To guide said clamping bands, guide projections 375 are provided which rise up from the support element 300. The guide projections 375 are designed such that they engage to a small extent over the respective clamping band 401, 402, in order to avoid an unwanted sliding-off from the clamping band 401, 402 when the support element 300 is tightened.

On the edges of the support element 300, holding projections 370 are provided which are bent by approximately 90° inwards in the direction of the sealing sleeve 200, not shown here. The holding projections 370 hold the sealing sleeve 200, not shown here, in position, wherein an unwanted displacement of the sealing sleeve 200 with respect to the support element 300 is avoided.

A first support element end portion 330 and a second support element end portion 340 are formed on the support element 300.

LIST OF REFERENCE CHARACTERS

100 Connecting device
200 Sealing sleeve
201 First end portion
202 Second end portion
210 Inner side
220 Outer side
230 First circle
240 Second circle
250 Sealing lip
260 Groove
270 Swellable sealing element
280 Edge
284 Sealing sleeve fixing projection
286 Sealing sleeve fixing receptacle
290 Stop
300 Support element 310 First support element contact pressing portion
320 Second support element contact pressing portion
330 First support element end portion
340 Second support element end portion
350 Fixing projection
360 Fixing receptacle
370 Holding projection
375 Guide projection
380 Connecting portion
390 Connecting arc
401 First clamping band
402 Second clamping band
A Axis
E1 First plane
E2 Second plane

The invention claimed is:

1. A connecting device (100) for connecting a first and a second tube, the connecting device (100) comprising a sealing sleeve (200), a plurality of support elements (300) and at least two clamping bands (401, 402), wherein in order to form the connection, a first of two end portions (201, 202) of the sealing sleeve (200) receives a tube end portion of the first tube and the second end portion (202) receives a tube end portion of the second tube, which are connected to each other by means of the sealing sleeve (200), wherein the sealing sleeve (200) has an inner side (210) and an outer side (220), and wherein the plurality of support elements (300) are arranged along the outer side (220) of the sealing sleeve (200) without being connected to each other, and wherein each support element (300) at least partly consists of or contains a deformable material, and wherein each support element (300) has a first support element contact pressing portion (310) and a second support element contact pressing portion (320), and wherein the first support element contact pressing portions (310) are arranged one following the other along a circumference of a first circle (230) along the outer side (220) of the sealing sleeve (200) and form a first support element end portion (330) having a first opening for receiving the first end portion (201) of the sealing sleeve (200), and wherein the second support element contact pressing portions (320) are arranged one following the other along a circumference of a second circle (240) along the outer side (220) of the sealing sleeve (200) and form a second support element end portion (340) having a second opening for receiving the second end portion (202) of the sealing sleeve (200), and wherein at least one first support element contact pressing portion (310) is connected to a second support element contact pressing portion (320) by means of at least one deformable connecting portion (380), wherein by means of shortening or extending of the clamping bands (401, 402), which are in the form of a first clamping band (401) and a second clamping band (402), and wherein the first clamping band (401) is associated with the first support element contact pressing portion (310) and the second clamping band (402) is associated with the second support element contact pressing portion (320) and the first support element contact pressing portions (310) are positioned closer to or farther from each other along the circumference of the first circle (230) along the outer side (220) of the sealing sleeve (200) and thus compress or relax the first end portion (201) of the sealing sleeve (200), and the second support element contact pressing portions (320) are positioned closer to or farther from each other along the circumference of the second circle (240) along the outer side (220) of the sealing sleeve (200) and thus compress or relax the second end portion (202) of the sealing sleeve (200).

2. The connecting device (100) according to claim 1, characterized in that the support element (300) has at least one fixing projection (350) or at least one fixing receptacle (360).

3. The connecting device (100) according to claim 1, characterized in that the support element (300) has at least one holding projection (370).

4. The connecting device (100) according to claim 1, characterized in that the support elements (300) are the same among each other.

5. The connecting device (100) according to claim 1, characterized in that the plurality of support elements (300) is four, five, six, seven, eight, nine, ten, eleven, twelve, thirteen, fourteen or fifteen in number.

6. The connecting device (100) according to claim 1, characterized in that the sealing sleeve (200) has, on the inner side (210) of the sealing sleeve (200), at least one sealing lip (250), which projects inwards from the inner surface (210) and is arranged along a curve which is formed continuously between a first plane E1 and a second plane E2, and/or that the sealing sleeve (200) has, on the inner side (210) of the sealing sleeve (200), at least one sealing lip (250) which projects inwards from the inner surface (210) and is arranged in a straight line in a plane.

7. The connecting device (100) according to claim 1, characterized in that the sealing sleeve (200) has, on the inner side (210) of the sealing sleeve (200), at least one groove (260) in which a swellable sealing element (270) is received.

8. An assembly comprising a connecting device (100) according to claim 1 and a first and a second tube which are connected to each other with the aid of the connecting device (100), wherein for forming the connection, a first of two end portions (201, 202) of the sealing sleeve (200) receives a tube end portion of the first tube, and the second end portion (202) receives a tube end portion of the second tube, which are connected to each other by means of the sealing sleeve (200).

* * * * *